United States Patent Office 2,951,878
Patented Sept. 6, 1960

2,951,878

CHLORINATED OLEFINS AND METHOD FOR PRODUCING SAME

Norman P. Neureiter, Baytown, Tex., assignor, by mesne assignments, to Esso Research and Engineering Company, Elizabeth, N.J., a corporation of Delaware No Drawing. Filed July 11, 1958, Ser. No. 747,850

5 Claims. (Cl. 260—648)

The present invention is directed to chlorinated olefins. More particularly, the invention is directed to specific chlorinated dienes and cyclo-olefins. In its more specific aspects, the invention is concerned with a method for producing chlorinated olefins.

The present invention may be briefly described as a method for producing chlorinated olefins from a feed stream of 1,1-dichloro-2-vinylcyclopropane which is heated to a temperature within the range of about 425° to about 575° C. at a pressure within the range from about 0 to about 25 mm. pressure to form a product containing chlorinated olefins different from the feed stream and recovering said product.

In heating the feed stream, it is desirable to heat the feed stream in the absence of free oxygen and to accomplish this the heating may be conducted in an atmosphere of an inert gas such as nitrogen, helium, argon, neon, xenon, and the like.

The product is submitted to recovery conditions which suitably may include distillation at a pressure no greater than 40 mm. with the distilled product being recovered under an atmosphere of inert gas of the type mentioned before. Preferably, the distilled recovered products are stored at temperatures from about 0° C. down to about −80° C. under an inert atmosphere to prevent polymerization reactions such as dimerization and resinification from occurring.

The product produced by heating the 1,1-dichloro-2-vinylcyclopropane contains substantial amounts of monochlorocyclopentadiene as a more important component, 4,4-dichlorocyclopentene, 1,1 - dichloropenta - 1,3 - diene, 1,1-dichloropenta-1,4-diene, and a dichloroisoprene.

In practicing the present invention, 1,1-dichloro-2-vinylcyclopropane is vaporized by heating it to a temperature in the neighborhood of about 80° C. and then it is caused to flow at the reduced pressure mentioned before through a furnace maintained at a sufficient temperature to heat the feed stream to a temperature within the range from about 425° to about 575° C. at a pressure within the range from about 0 to about 25 mm. pressure. Preferably, the feed stream is heated to a temperature in the range from about 475° to about 525° C. at a pressure of about 5 mm. The feed stream is exposed to the elevated temperature for a time in the range of from about 0.1 to about 0.5 second with good results being obtained while heating for about 0.3 second. Under these conditions, the 1,1-dichloro-2-vinylcyclopropane is converted in substantial amounts (85–95%) to monochlorocyclopentadiene (20–35%), 4,4-dichlorocyclopentene (2–10%), 1,1 - dichloropenta - 1,3 - diene (20–40%), 1,1 - dichloropenta - 1,4 - diene (20–40%), and a dichloroisoprene (1–4%), as the several reaction products, the formation of the monochlorocyclopentadiene proceeding through the intermediate formation of the 4,4-dichlorocyclopentene.

In order to illustrate the invention further, 1,1-dichloro-2-vinylcyclopropane was heated to a sufficient temperature to vaporize same and then passed through a Vycor tube enclosed in a furnace, the vaporized dichloro-2-vinylcyclopropane being exposed to the elevated temperatures within the range given for about 0.3 second at a pressure of about 5 mm. The reaction products were led into a train of Dry Ice and liquid nitrogen enclosed vessels for collection of same and the products were then distilled under a blanket of nitrogen. The distilled fractions were then subjected to hydrogenation for identification thereof, the hydrogenated products being normal pentane, cyclopentane, and isopentane, from which it was concluded that the corresponding halogenated olefins had been obtained.

A first fraction from the distillation of the reaction product, which was monochlorocyclopentadiene, was caused to react with maleic anhydride to form the Diels-Alder adduct from which it was determined that this first fraction was monochlorocyclopentadiene.

A portion of the first cut was submitted for analysis by ultraviolet, infrared nuclear magnetic resonance and mass spectrometers, all of which showed a structure which was identified as monochlorocyclopentadiene. Vapor phase chromatography and recovery and analysis of the other distillation fractions indicated the presence of the other assigned structures.

The reaction product, including the monochlorocyclopentadiene, the 4,4-dichlorocyclopentene, the two 1,1-dichloropentadienes, and the dichloroisoprene are quite useful compounds, being important as intermediate materials in synthesis suitable for antiknock and lubricant uses. Not only are the compounds useful in this manner, but they also may be useful in the preparation of coatings by virtue of their reactant nature since they polymerize readily at ambient temperatures. For example, the monochlorocyclopentadiene is a liquid boiling at about 105° C., and unless it is stored at relatively low temperatures in the absence of oxygen, it will dimerize readily and ultimately form a reddish viscous material, the presence of oxygen causing discoloration while in the absence of oxygen, the polymerized products may be colorless.

The nature and objects of the present invention having been completely described and illustrated, what I wish to claim as new and useful and secure by Letters Patent is:

1. A method for producing chlorinated olefins which comprises heating a feed stream of 1,1-dichloro-2-vinylcyclopropane at a temperature within the range from about 425° to about 575° C. at a pressure within the range from about 0 to about 25 mm. to form a product containing chlorinated olefins different from the feed stream and recovering said product.

2. A method in accordance with claim 1 in which the feed stream is heated to a temperature within the range from about 475° to about 525° C. at a pressure of about 5 mm.

3. A method in accordance with claim 1 in which the chlorinated olefins are recovered by distillation of the product at a pressure no greater than 40 mm.

4. A method in accordance with claim 1 in which the feed stream is heated and the product recovered while maintaining the feed and product free from contact with free oxygen.

5. A method in accordance with claim 1 in which the recovered product is stored at a temperature in the range from about 0 to about −80° C. while maintaining the stored product out of contact with free oxygen.

References Cited in the file of this patent

Favorskii, Chem. Abs. 30, 6337[9] (1936).